United States Patent [19]

Gerritsen

[11] Patent Number: 4,878,717

[45] Date of Patent: Nov. 7, 1989

[54] APPARATUS AND METHOD FOR RAPIDLY CONSTRUCTING HOLOGRAMS

[75] Inventor: Hendrik J. Gerritsen, Providence, R.I.

[73] Assignee: Brown University Research Foundation, Providence, R.I.

[21] Appl. No.: 122,373

[22] Filed: Nov. 19, 1987

[51] Int. Cl.[4] .................. G03H 1/08; G03H 1/30
[52] U.S. Cl. .................. 350/3.66; 350/3.74; 350/3.76; 350/3.85
[58] Field of Search .............. 350/3.66, 3.76, 3.85, 350/3.86, 320, 3.74

[56] References Cited

U.S. PATENT DOCUMENTS

| | | | |
|---|---|---|---|
| 3,698,787 | 10/1972 | Mueller et al. | 350/3.66 X |
| 3,819,248 | 6/1974 | Takeda et al. | 350/3.74 |
| 3,919,881 | 11/1975 | Metherell | 350/366 X |
| 3,957,353 | 5/1976 | Fienup et al. | 350/3.66 X |
| 4,142,772 | 3/1979 | Lurie | 350/3.66 |
| 4,277,137 | 7/1981 | Upatnieks et al. | 350/162.13 |
| 4,422,729 | 12/1983 | Suzuki et al. | 350/392 X |
| 4,464,018 | 8/1984 | Gagnon | 350/401 X |
| 4,498,740 | 2/1985 | Caulfield | 350/3.66 |
| 4,715,683 | 12/1987 | Gregory et al. | 350/3.66 X |

OTHER PUBLICATIONS

Gerritsen, H. et al., *Applied Optics*, vol. 26, No. 17, Sep. 1, 1978, pp. 3717–3720.
Brown, M., "Computer Does the Modeling", *London Times*, Jun. 21, 1987.
"Holograms May Give Design a New Dimension", *Sunday Times*, Jun. '87.

*Primary Examiner*—Bruce Y. Arnold
*Assistant Examiner*—David J. Edmondson
*Attorney, Agent, or Firm*—Joseph S. Iandiorio; Brian M. Dingman

[57] ABSTRACT

An apparatus for constructing a hologram of one or more two-dimensional images by displaying the images on a variable-reflectance device. An object beam of coherent radiation is directed at the variable-reflectance device to be redirected by the device to a holographic plate, and a reference beam of coherent radiation is directed at the holographic plate to produce, in combination with the redirected object beam, a holographic interference pattern on the plate to form a hologram on the plate. A masking device, preferably electronic, may be provided to selectively expose successive portions of the plate corresponding to successive ones of the images to form a multiplex hologram on the plate.

20 Claims, 2 Drawing Sheets

APPARATUS AND METHOD FOR RAPIDLY CONSTRUCTING HOLOGRAMS

FIELD OF INVENTION

This invention relates to an apparatus and method for constructing a hologram and more particularly to such a system and method which record two-dimensional images directly from a variable-reflectance device onto a holographic plate.

BACKGROUND OF INVENTION

There are a number of applications in which construction of a stereoscopic hologram from one or more two-dimensional images is desirable. For example, the structure of an organic molecule can be more fully appreciated when the molecule is shown as a three-dimensional image.

It is particularly useful to provide a hologram of a two-dimensional image generated by a computer. Objects generated by a computer can be more fully studied when viewed in three dimensions, and holograms often serve as an effective yet less expensive alternative to the construction of models. They also facilitate interaction with and manipulation by the user.

Two-dimensional images can not be directly recorded on a holographic plate from typical computer screens which emit their own light, usually from a cathode ray tube screen. Because an object must be illuminated by an object beam of coherent radiation during construction of a hologram, a substitute image of the object, such as a photograph, must first be provided to portray the image.

A multiplex hologram is a hologram containing many narrow strips of holograms, each strip carrying a slightly different view, spacially or temporally, of an object to be displayed. By moving the hologram relative to the viewer, the different perspectives of the object are seen as if a three-dimensional object were present, or as if the object were changing over time.

Presently, to develop a multiplex hologram from a computer screen having a cathode ray tube, a photograph must be taken of the screen for each perspective of the object portrayed on the computer screen. Typically, more than one thousand perspectives, and therefore more than one thousand separate photographs, are required to satisfactorily construct a multiplex hologram. Each photograph must be developed as a print from a negative. In addition to the time and expense involved in developing the large number of prints, the quality of the prints may vary depending on the consistency of the chemicals during the lengthy development period. Each print must be carefully positioned on a holographic table in front of a holographic plate. After the image on that print is recorded, the next print must be carefully positioned and recorded, and so on for more than one thousand prints. Because holograms are established by interference patterns, the slightest vibration on the holographic table interferes with construction of the hologram. A substantial period of time, often as long as ten minutes, must elapse between each repositioning of the next print to allow the holographic table to settle.

In addition, successive portions of the holographic plate must be successively exposed and then masked to record the successive images. Typically, a mechanical sliding slit is positioned in front of the holographic plate to be exposed. Further vibrations are generated when the slit is repositioned.

One system generates a hologram by processing an electronic signal, such as from a video camera. For each of the series of samples of a video signal, the signal is modulated into an information beam whose phase is modified relative to a reference beam. However, the image must be scanned line-by-line and separately modulated for each pixel. In other words, the entire image can not be recorded from the video camera in a single operation.

SUMMARY OF INVENTION

It is therefore an object of this invention to provide an improved system and method for constructing a hologram of one or more two-dimensional images.

It is a further object of this invention to provide such a system and method which more rapidly construct a hologram.

It is a further object of this invention to provide such a system and method which provide more uniform multiplex holograms.

A still further object of this invention is to provide such a system and method which accurately and repeatedly position images to be recorded.

It is a further object of this invention to provide such a system and method which minimize vibrations.

Yet another object of this invention is to provide a system and method utilizing a masking device which is completely electronic and is free of moving parts.

It is a further object of this invention to provide such a masking device which does not generate vibration during repositioning of its transmissive slit.

This invention features an apparatus for constructing a hologram of an image. The apparatus includes a variable-reflectance device whose reflectance varies in a pattern representative of a two-dimensional image, a holographic plate to be exposed, and means for directing an object beam of coherent radiation at the variable-reflectance device to be redirected by the device to the holographic plate. The apparatus further includes means for directing a reference beam of coherent radiation at the holographic plate to produce, in combination with the redirected object beam, a holographic interference pattern on the plate to form a hologram.

This invention also features an apparatus for constructing a multiplex hologram of two-dimensional images, including a variable reflectance device, a holographic plate, means for directing an object beam at the variable-reflectance device to be redirected by the device to the holographic plate, and means for directing a reference beam at the holographic plate. The apparatus further includes mask means for selectively exposing successive portions of the plate corresponding to successive ones of the images to form a multiplex hologram on the plate.

In one embodiment, the variable-reflectance device includes a liquid crystal display screen having a twisted nematic or dynamic scattering liquid crystal device. A contrasting backdrop may be disposed behind the dynamic scattering liquid crystal device. Alternatively, the variable-reflectance device includes a cathode reflectance tube.

In another embodiment, the mask means includes an electronic masking device having an electro-optical element whose transparency varies as a function of an electric field across it. The masking device further includes means for selectively varying the field to selectively expose the holographic plate. The electro-optical element is a liquid crystal device having first transparent electrode means disposed on one of the incident and exit sides of the liquid crystal device and second transparent electrode means disposed on the other side of the device. The first electrode means may include a plurality of separate electrode strips separately energizable by the means for varying, and the second electrode means includes a single backplane electrode at least as large as the first electrode means. First and second polarizing means may be disposed on the incident and exit sides of the liquid crystal device, respectively, and are oriented to have their polarizations differ from each other. The apparatus may further include means for generating the series of images, and the means for selectively varying includes means for commanding the means for generating to produce successive ones of the images to control alignment of a transparent window in the electro-optical device with the successive portions of the holographic plate corresponding to the successive ones of the images. The liquid crystal device includes a twisted nematic liquid crystal.

This invention further features an apparatus for constructing a multiplex hologram, including a series of images, a holographic plate, means for directing an object beam, and means for directing a reference beam. The apparatus further includes mask means including an electronic masking device having an electro-optical element and means for selectively varying an electric field across the device.

The invention still further features a method of constructing a hologram of an image, including generating a two-dimensional image, displaying the image on a variablereflectance device, providing a holographic plate to be exposed, and directing an object beam of coherent radiation at the variable-reflectance device to be redirected by the device to the holographic plate. The method further includes directing a reference beam of coherent radiation at the holographic plate to produce, in combination with the redirected object beam, the holographic interference pattern of the image to form a hologram on the plate. A multiplex hologram of two-dimensional images may be constructed by generating a series of two-dimensional images, displaying successive ones of the images on a variable-reflectance device, and selectively exposing portions of a holographic plate with an object beam and a reference beam to form a multiplex hologram on the plate.

DISCLOSURE OF PREFERRED EMBODIMENT

Other objects, features and advantages will occur from the following description of a preferred embodiment and the accompanying drawings, in which.

This invention may be accomplished by an apparatus which utilizes a variable-reflectance device to construct a hologram of one or more two-dimensional images. The reflectance of the variable-reflectance device varies in a pattern representative of the images. The apparatus further includes elements for directing an object beam of coherent radiation at the variable-reflectance device to be redirected by the device to a holographic plate to be exposed. There are also elements for directing a reference beam of coherent radiation at the holographic plate to produce, in combination with the redirected object beam, a holographic interference pattern on the plate to form a hologram.

Figure 1:
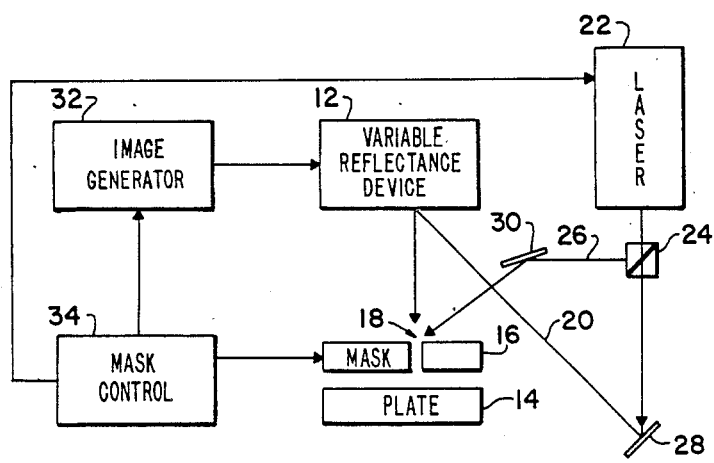
FIG. 1 is a schematic block diagram of a hologram generating system according to this invention utilizing a variable reflectance device.

An apparatus according to this invention is particularly suited for constructing a multiplex hologram. Image generating system 10 according to this invention, FIG. 1, includes variable-reflectance device 12 whose image is recorded on holographic plate 14. Mask 16 defines slit 18 which is sequentially positioned to record sequential strips of holograms on plate 14.

Variable-reflectance device 12 is directly illuminated by object beam 20 from laser 22. Beam splitter 24 separates object beam 20 from reference beam 26. Beams 20, 26 are guided by mirrors 28, 30, respectively.

In this construction, two-dimensional images are generated by image generator 32, such as a microcomputer. Alternatively, images are stored in memory and successively provided to variable-reflectance device 12. Mask control 34 coordinates provision of the next image from image generator 32 to variable-reflectance device 12 with the positioning of slit 18 in mask 16. Further, mask control 34 operates laser 22 such as by controlling its shutter.

Variable-reflectance device 12 is a device whose reflectance is controllable and which does not provide its own illumination. One such device is a twisted nematic liquid crystal screen. Another suitable device is a cathode reflectance tube. A cathode reflectance tube is similar to a vacuum cathode ray tube, but electrons change the absorption properties of the material, such as a sodalite, instead of exciting a light-emitting phosphor. Yet another suitable device is a dynamic scattering liquid crystal device which appears clear without a voltage across its electrodes, and appears milky to an observer due to small-scale turbulence when a voltage is established across the electrodes. Dynamic scattering liquid crystal devices are viewed by an observer by placing a black background behind the display so that, when energized, an image appears white against black.

Figure 2:
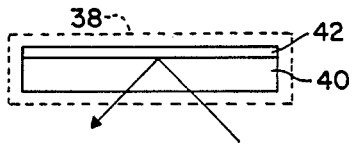
FIG. 2 is a schematic top plan view of a dynamic scattering liquid crystal device and a contrasting backdrop.

It is a feature of this invention that a hologram can be constructed by illuminating a dynamic scattering liquid crystal device with laser light. However, the energized portions of the display appear black instead of milky when imaged by the hologram because small-scale turbulence in the energized portions scatters the laser light and destroys its coherence. As shown in FIG. 2, liquid crystal display screen 38 includes dynamic scattering liquid crystal device 40 and contrasting background 42 which is pale in coloration and preferably substantially white. An image displayed on device 40 is revealed as black against the pale background provided by backdrop 42. In one construction backdrop 42 is removable so that a dark-colored background can be placed behind device 40 during viewing by an observer, and can be replaced with a white material during illumination by a laser.

Figure 3:
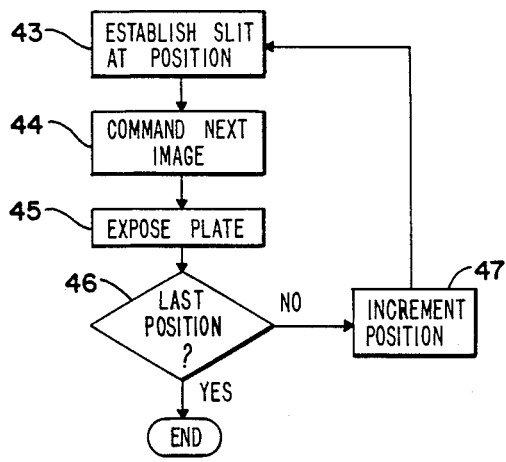
FIG. 3 is a flow chart of the operation of a masking device according to this invention.

The operation of mask control 34 is shown in FIG. 3. Slit 18 is established at a selected position, step 43, and image generator 32 is commanded to provide the next image to variable-reflectance device 12, step 44. Plate 14 is exposed, step 45, after which the position is incremented until the last position is reached, steps 46, 47. When mask 16 is an electronic masking device, as described below, the slit is established during step 43 by selectively varying an electric field across the masking device, as commanded by mask control 34.

Figure 4:
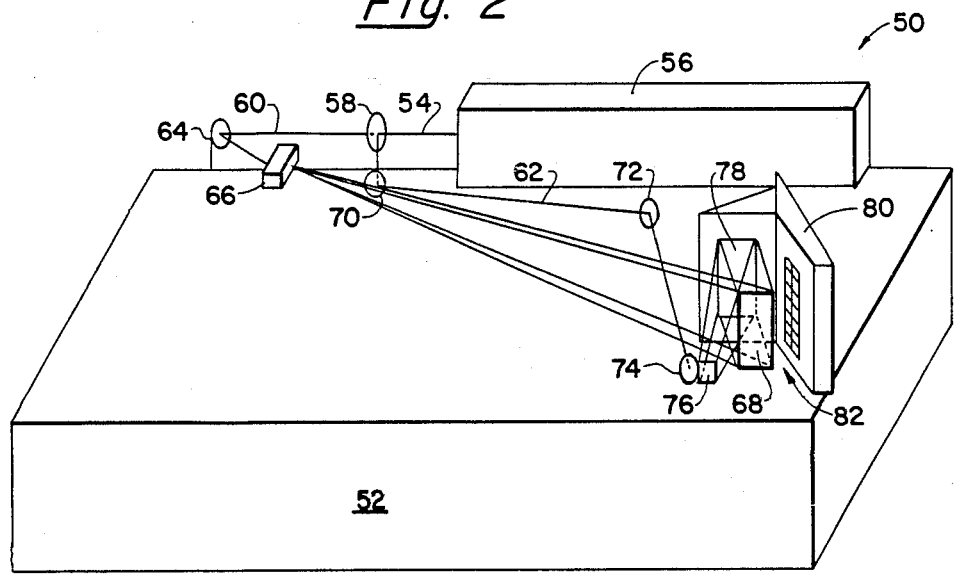
FIG. 4 is a schematic axonometric view of another hologram generating system according to the present invention.

Another apparatus for constructing a multiplex hologram is shown in FIG. 4. Hologram generating system 50 according to this invention is positioned on holographic table 52. Beam 54 from laser 56 is divided by beam splitter 58 into reference beam 60 and object beam 62. Reference beam 60 is guided by mirror 64 and spatial filter 66 to holographic plate 68. Object beam 62 is guided by mirrors 70, 72 and 74 to spatial filter 76 and then to variable-reflectance device 78.

In this construction, variable-reflectance device 78 is part of a personal computer 80 such as a TRS 80 Model 102 available from Radio Shack. This device utilizes a twisted hematic liquid crystal screen. The display screen of computer 80 is positioned five inches from holographic plate 68, corresponding to a selected viewing distance of five inches by an observer once the hologram is formed. Successive two-dimensional images of a three-dimensional object such as a cube are generated to represent rotation of the cube in intervals of approximately three degrees. An exposure is made on a different portion of holographic plate 68 for each image.

Figure 5:
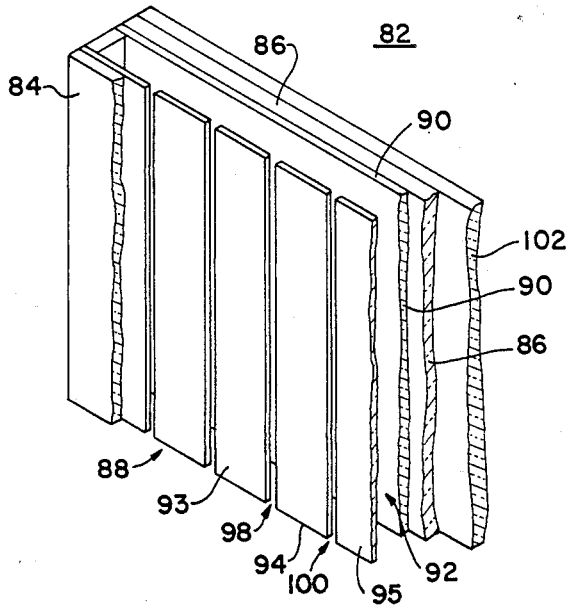
FIG. 5 is an axonometric partial cutaway view of the electronic masking device according to this invention shown in FIG. 4.

Masking device 82, not visible in FIG. 4, is shown in an enlarged, partial cutaway view in FIG. 5. Masking device 82 includes glass plates 84, 86 on which are disposed transmissive electrodes 88, 90, respectively. A twisted nematic crystal is disposed in space 92 between electrodes 88, 90.

Electrodes 88, 90 may be formed of tin oxide or indium-tin oxide deposited directly on glass plates 84, 86, respectively. Electrode 90 serves as a common backplane electrode for separate strips such as strips 93, 94, 95 of electrode 88. In one construction, electrodes 93, 94, 95 are parallel to each other, have a width ranging between 0.5 and 10 millimeters, and are separated by gaps 98, 100 having a width ranging between 0.01 and 0.5 millimeters. Electrode 88 may be separated into over one thousand separate strips.

Polarizers having their polarizations oriented transversely to each other are disposed on either side of masking device 82, one on the incident side and the other on the exit side. Polarizer 102 is shown disposed behind glass plate 86. When the polarizations of the polarizers are oriented normal to each other the twisting of the crystal in nonenergized areas rotates incident light ninety degrees so that it exits at an orientation which passes through the second polarizer. When the liquid crystal is energized and its molecules untwist, the activated area blocks incident light.

During operation, one strip is not energized while the remainder are energized to provide a single transmissive window to selectively expose a holographic plate placed behind masking device 82. Alternatively, the strips are energized in overlapping pairs. For example, all strips except strips 93, 94 are energized during one exposure, and then all strips except strips 94, 95 are energized for the next exposure. Continuity and smoothness in the construction of a three-dimensional image is enhanced by this technique.

While the electronic masking device has been described as a device having a twisted nematic liquid crystal, this is not a limitation of the invention. An electronic masking device according to this invention can be achieved by any device having an electro-optical element whose transparency varies as a function of an electric field across it, and an element for selectively varying the field to selectively expose a holographic plate positioned behind the masking device. In this manner repeated exposures are made rapidly, conveniently, and without vibration. Futher, such an electronic masking device can be used during construction of multiplex holograms from images displayed on devices other than variable-reflectance devices.

Although specific features of the invention are shown in some drawings nd not others, this is for convenience only as each feature may be combined with any or all of the other features in accordance with the invention.

Other embodiments will occur to those skilled in the art and are within the following claims:

What is claimed is:

1. An apparatus for constructing a multiplex hologram of two-dimensional images, comprising:
   a variable-reflectance device whose reflectance varies in a series of patterns representative of a series of two-dimensional images;
   a holographic plate to be exposed;
   means for directing an object beam of coherent radiation at said variable-reflectance device to be redirected by said device to said holographic plate;
   means for directing a reference beam of coherent radiation at said holographic plate to produce, in combination with said redirected object beam, a holographic interference pattern on said plate; and
   mask means for selectively exposing successive portions of said plate corresponding to successive ones of said images to form a multiplex hologram on said plate.

2. The apparatus of claim 1 in which said variable-reflectance device includes a liquid crystal display screen.

3. The apparatus of claim 2 in which said liquid crystal display screen includes a twisted nematic liquid crystal device.

4. The apparatus of claim 2 in which said liquid crystal display screen includes a dynamic scattering liquid crystal device.

5. The apparatus of claim 4 in which said liquid crystal display screen further includes a contrasting backdrop disposed behind said dynamic scattering liquid crystal device.

6. The apparatus of claim 5 in which said contrasting backdrop is pale in coloration.

7. The apparatus of claim 5 in which said contrasting backdrop is substantially white 8. The apparatus of claim 1 in which said variable-reflectance device includes a cathode reflectance tube.

9. The apparatus of claim 1 in which said mask means includes an electronic masking device having an electro-optical element whose transparency varies as a function of an electric field across it, and having means for selectively varying said field to selectively expos said holographic plate.

10. The apparatus of claim 9 in which said electro-optical element is a liquid crystal device having first transparent electrode means disposed on one of the incident and exit sides of said liquid crystal device and having second transparent electrode means disposed on the other side of said liquid crystal device.

11. The apparatus of claim 10 in which said second electrode means includes a single backplane electrode at least as large as said first electrode means.

12. The apparatus of claim 10 in which said masking device further includes first and second polarizing means disposed on the incident and exit sides of said liquid crystal device, respectively, and oriented to have polarizations which differ from each other.

13. The apparatus of claim 10 in which said liquid crystal device includes a twisted nematic liquid crystal.

14. The apparatus of claim 9 further including means for generating said series of images.

15. The apparatus of claim 14 in which said means for selectively varying includes means for commanding said means for generating to provide successive ones of said images to said variable-reflectance device to match transparency in said electro-optical device with the successive portions of said holographic plate corresponding to the successive ones of said images.

16. An apparatus for constructing a multiplex hologram of a series of images, comprising:
   a holographic plate to be exposed;
   means for directing an object beam of coherent radiation at successive ones of said images to be redirected by said images to said holographic plate;
   means for directing a reference beam at said holographic plate to produce, in combination with said redirected object beam, a holographic interference pattern on said plate; and
   mask means including an electronic masking device for selectively exposing successive portions of said plate corresponding to successive ones of said images to form a multiplex hologram on said plate, said masking device having an electro-optical element whose transparency varies as a function of an electric field across it, and having means for selectively varying said field to selectively expose said holographic plate.

17. The apparatus of claim 16 in which said electro-optical element is a liquid crystal device having first transparent electrode means disposed on one of the incident and exit sides of said liquid crystal device and second transparent electrode means disposed on the other side of said liquid crystal device, said first electrode means including a plurality of separate electrode strips separately energizable by said means for varying, and said second electrode means including a single backplane electrode at least as large as said first electrode means.

18. The apparatus of claim 17 further including means for generating said series of images and means, responsive to said means for generating, for displaying said images.

19. The apparatus of claim 18 in which said means for selectively varying includes means for commanding said means for generating to provide successive ones of said images to said means for displaying to match transparency in said electro-optical device with the successive portions of said holographic plate corresponding to the successive ones of said images.

20. A method of constructing a multiplex hologram of two-dimensional images, comprising:
   generating a series of two-dimensional images;
   displaying successive ones of said images on a variable-reflectance device;
   providing a holographic plate to be exposed;
   directing an object beam of coherent radiation at the variable-reflectance device to be redirected by the device to the holographic plate;
   directing a reference beam of coherent radiation at the holographic plate to produce, in combination with the redirected object beam, a holographic interference pattern on the plate; and
   selectively exposing portions of the plate corresponding to successive ones of the images to form a multiplex hologram on the plate.

* * * * *